United States Patent [19]
Ginsburgh

[11] 3,837,570
[45] Sept. 24, 1974

[54] DATA RECEIVING STORING AND IMPRINTING APPARATUS

[75] Inventor: Irwin Ginsburgh, Morton Grove, Ill.

[73] Assignee: Standard Oil Company, Chicago, Ill.

[22] Filed: Apr. 1, 1970

[21] Appl. No.: 24,782

[52] U.S. Cl.... 235/61.9 R, 101/93 C, 235/61.11 D, 235/61.7 B
[51] Int. Cl.................... G06k 15/02, G06k 7/08
[58] Field of Search....... 235/61.11 E, 61.7 B, 61.9, 235/61.1, 61.7; 340/149 A; 101/269, 282, 283, 284, 285

[56] References Cited
UNITED STATES PATENTS
3,447,457 6/1969 Dechert............................ 101/269
3,548,160 12/1970 Welsh.............................. 235/61.11

*Primary Examiner*—Daryl W. Cook
*Attorney, Agent, or Firm*—Fred F. Fondriest; Arthur G. Gilkes; William T. McClain

[57] ABSTRACT

Data corresponding to the amount of a sale and the account number of the customer are received and stored in an apparatus using a modular cassette tape recorder. A customer's credit card including machine readable data indicia corresponding to the customer's account number is placed in a holding station on the apparatus. Then, manually operable means are adjusted to provide machine readable data indicia corresponding to the value of a purchase. The apparatus includes a movable data imprinting and reading head mounted so that it can scan the indicia on the card and also the indicia corresponding to the purchase. This head generates electromagnetic signals corresponding to the indicia and these signals are recorded and stored on the tape in the cassette recorder. A sales ticket at the station and overlying the card is simultaneously imprinted when the indicia is scanned by the head.

3 Claims, 5 Drawing Figures

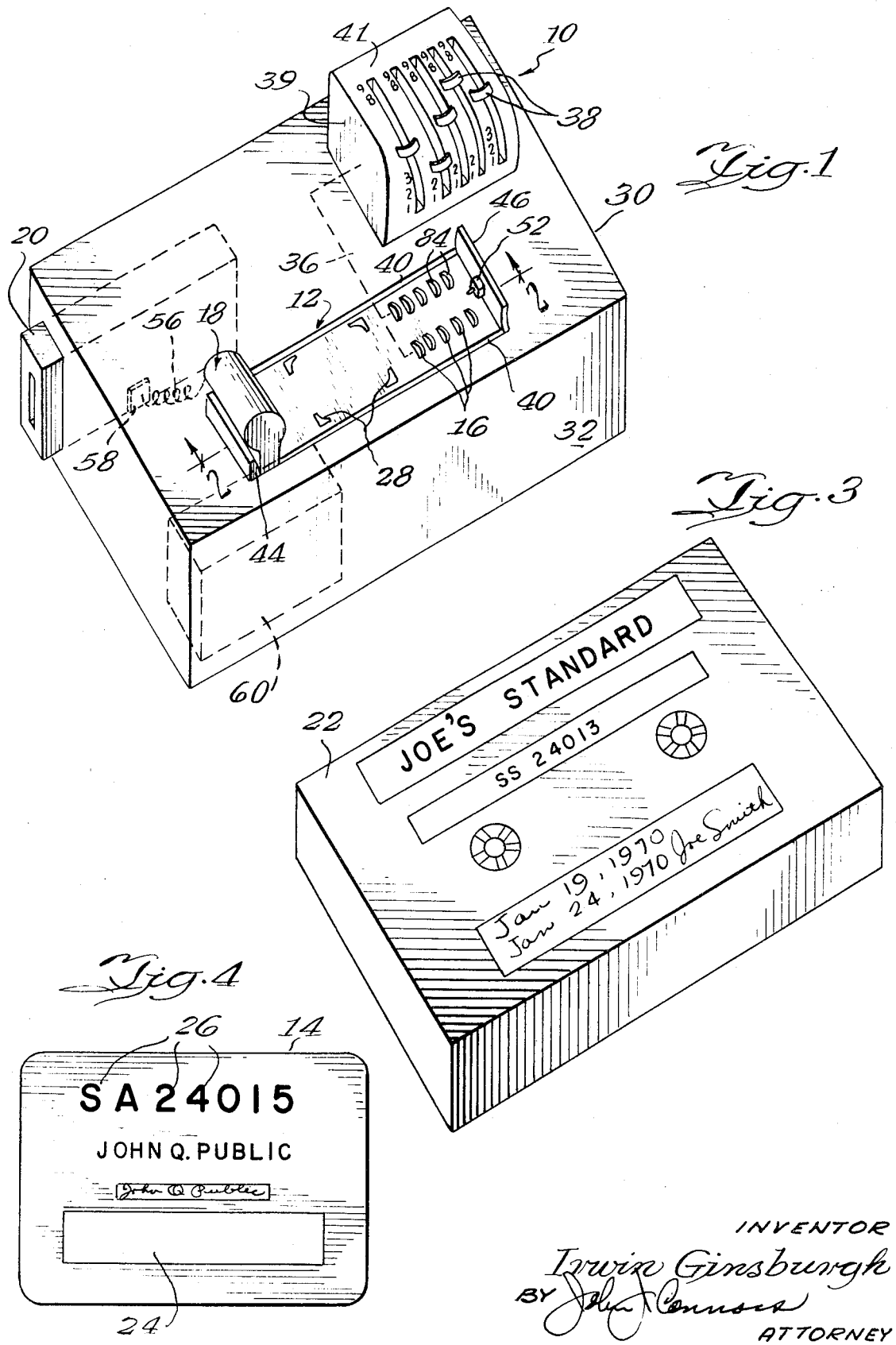

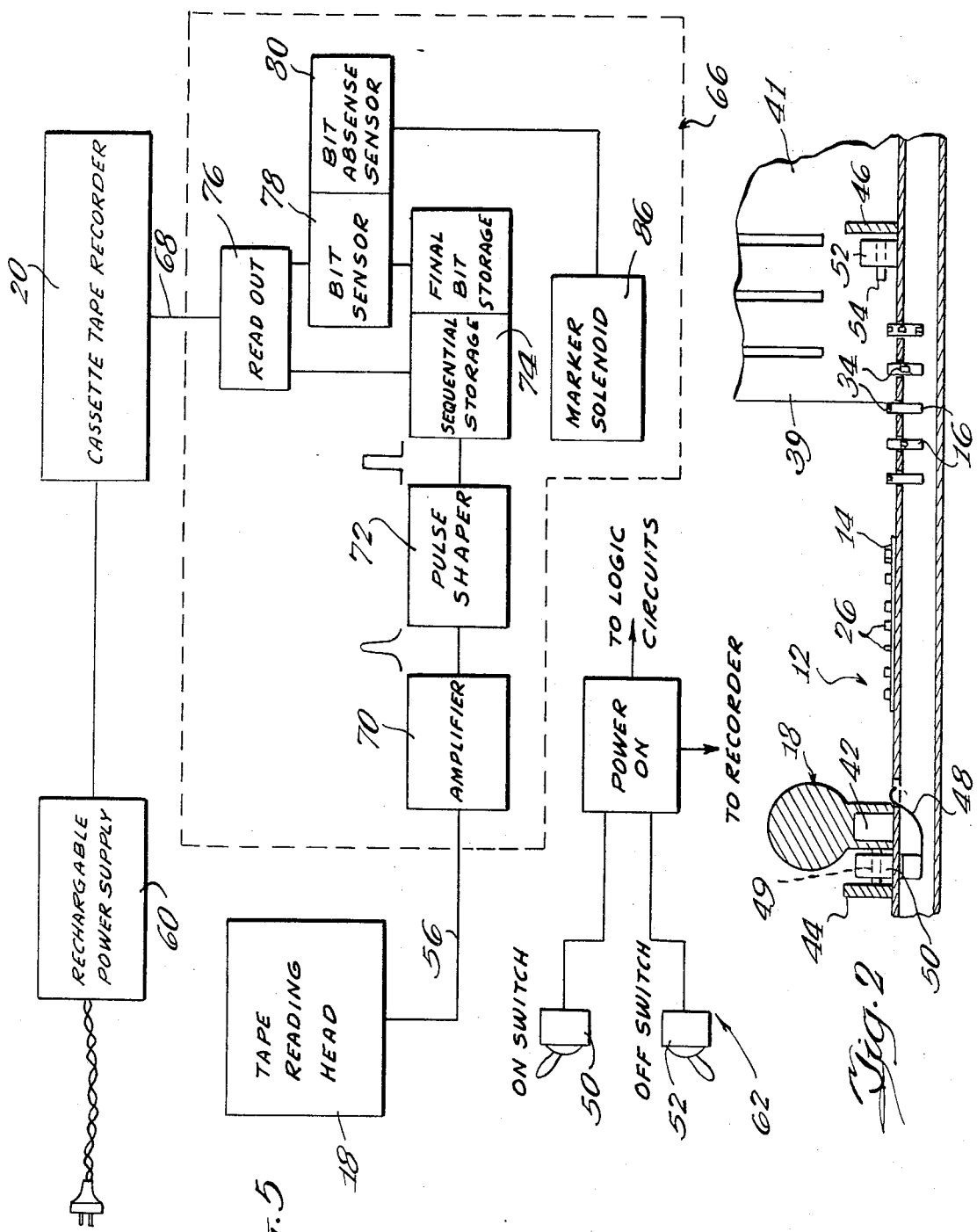

DATA RECEIVING STORING AND IMPRINTING APPARATUS

BACKGROUND OF THE INVENTION

One major problem plaguing retail sales operations is the handling of sales receipts from credit card customers. These sales receipts are sent to a central credit office, read, photocopied, sorted and stored. Obviously, there would be significant savings if these receipts could be eliminated or at least the necessity for extensively handling them could be minimized. I have invented an apparatus which eliminates the necessity for handling most of these receipts by a central credit office, but at the same time provides a customer's sales receipt and a dealer's receipt which is stored locally to provide a back-up in case the sales data are lost. Such an apparatus will, for example, find a ready market in the sale of gasoline to credit account customers.

SUMMARY OF THE INVENTION

My apparatus receives and stores data and it includes a station for holding a credit card which carries machine readable data indicia corresponding to the customer's account number. At or near the station are manually operable means such as magnetic wheels carrying a plurality of magnetic inserts. These wheels, when properly adjusted, provide machine readable data indicia corresponding to the value of the customer's purchase. Manually movable data imprinting and reading means is mounted to move along a path past the station and past the indicia corresponding to the value of a purchase. Thus, the indicia on the credit card and the indicia corresponding to the value of the purchase are scanned when an attendant moves the imprinting and reading means. The imprinting and reading means includes means which responds to the indicia and generates electromagnetic signals corresponding to these indicia. A modular tape recording means is coupled to the data imprinting and reading means, and it receives and records the electromagnetic signals on magnetic tape in the recording means. When an embossed credit card and an additional set of imprinting wheels are used, a conventional multi-sheet carbonized sales ticket is simultaneously imprinted as the imprinting and reading means scans the data indicia.

DESCRIPTION OF DRAWINGS

FIG. 1 is a schematic perspective view of my data receiving, storing and imprinting apparatus.

FIG. 2 is a cross-section taken along line 2—2 of FIG. 1.

FIG. 3 is a perspective view of a cassette housed in a modular tape recording unit used in my apparatus.

FIG. 4 shows an embossed data card which can be used with my apparatus.

FIG. 5 is a simplified control circuit for my apparatus.

PREFERRED EMBODIMENT

As seen in FIGS. 1 and 2, apparatus 10 of my invention includes most basic elements of a conventional imprinter such as station 12 for holding data card 14 (FIG. 4). In addition to conventional elements, the following elements are also included in my apparatus 10: manually adjustable magnetic wheels 16 which provide machine readable data indicia corresponding to the dollar value of a purchase; a manually operated data imprinting and reading head 18; and a modular cassette tape recorder 20 including a removable cassette 22 (FIG. 3). Data card 14 carries machine readable data indicia corresponding to a customer's account number. a similar card would be used by the retail dealer who would use his card to initially transmit his account number to recorder 20. The indicia on card 14 may be in the form of a magnetic strip 24 encoded with the customer's or dealer's account number. Preferably, card 14 also includes embossed letters and numerals 26 which are used to imprint a sales ticket.

Station 12 may simply be a frame 28 on the top 30 of housing 32 of apparatus 10. The service attendant simply places data card 14 in frame 28 and the sales ticket on top of the card. The dollar value of the purchase corresponds to the position of adjustable magnetic wheels 16. These wheels 16, mounted to revolve and including magnetic inserts 34 (FIG. 2), are connected by mechanical linkages 36 (shown in dotted lines) to levers 38 of accounting mechanism 39. Mechanism 39 includes face plate 41 having thereon a series of numbers opposite levers 38. The attendant, by moving levers 38 opposite the numbers corresponding to the value of a purchase, turns magnetic wheels 16 to the correct position.

Imprinting and reading head 18 is mounted in a suitable slot or track 40 which straddles frame 28 and wheels 16, and it includes a conventional imprinting roll (not shown), a solenoid actuated marker (not shown), and a conventional magnetic reading or pickup element 42 (FIG. 2) which responds to the indicia on card 14 and wheels 16 and generates electromagnetic signals or bits corresponding to this indicia. With card 14 and a sales ticket at station 12, and magnetic wheels 16 properly positioned, the attendant grasps imprinting and reading head 18 and moves it past the card, ticket and magnetic wheels. At both ends of track 40 are stops 44 and 46 which limit this movement of head 18. Spring 48 normally holds head 18 firmly against arm 49 of switch 50 at stop 44. So long as head 18 is in this position, recorder 20 is off; but when the attendant moves head 18 toward switch 52 at stop 46, arm 49 is released, turning on recorder 20. When head 18 contacts arm 54 of switch 52, recorder 20 is turned off.

The signals or bits generated with scanning are transmitted to cassette tape recorder 20 via extendible coiled cable 56, having end 58 which plugs into recorder 20. Conveniently, a rechargeable battery 60 is also included in my apparatus 10 for providing power to tape recorder 20 and control circuit 62 (FIG. 5). The simplified control circuit 62 shows the imprinting and recording head 18 electrically coupled to tape recorder 20 through cable 56, logic circuit 66 and conductor 68. Thus, the electromagnetic signals or bits corresponding to data and generated by head 18 are transmitted via cable 56, circuit 66, and conductor 68 to recorder 20.

Logic circuit 66 includes amplifier 70 which amplifies the signals from head 18, pulse shaper 72 which shapes these amplified signals into square waves, sequential storage circuit 74, and readout circuit 76. As head 18 reads the indicia from strip 24 and wheels 16, the bits generated by pickup element 42 and processed by amplifier 70 and shaper 72 are sequentially fed into storage circuit 74. When the scan of head 18 is completed, the last bit is accumulated in storage circuit 74.

Since the maximum number of bits are known, storage circuit 74 is designed so that the reception of the last bit will signal this circuit to switch to a readout mode, whereupon the bits are transmitted via bit sensor 78 to readout circuit 76 and then into recorder 20. If card 14 does not have a magnetic strip or the like, storage circuit 74 will not switch to the readout mode. Bit absence sensor 80 responds to this condition and actuates marker solenoid 86. Solenoid 86 then operates the marker in head 18 which in turn marks the sales ticket to indicate that no data have been recorded.

As indicated, my apparatus 10 also has the capability of imprinting a conventional credit sales ticket having a customer copy and an attendant copy. However, these sales tickets need never be sent to the central credit office unless it is necessary to verify a customer's account or there has been a loss of data. After an appropriate period of time, the dealer may simply discard his copy. Embossed data card 14 and conventional embossed imprinting wheels 84 (FIG. 1) are used to mark the sales ticket with the customer's account number and value of purchase. These imprinting wheels 84 are also adjusted through linkages 36 when the attendant positions levers 38. Head 18 thus serves the dual function of (a) reading bits of information from magnetic wheels 16 and from magnetic strip 24, and of (b) firmly pressing embossed letters and numbers 26 on card 14 and embossed imprinting wheels 84 against a sales ticket which the attendant places in an overlying position on data card 14. Consequently, in addition to recording and storing data in recorder 20, data is recorded and stored on the sales ticket. Tape recorder 20 is periodically removed and the suitably marked cassette 22 is sent to the central credit office where the stored data are processed and the customer is billed accordingly. When a new cassette is inserted in the recorder 20, the first data recorded is from a dealer's data card so that cassette 22 is properly identified. Since the data are stored on magnetic tape it can be easily processed using conventional data handling equipment.

The back-up system provided by the retained sales ticket virtually eliminates any loss of data.

I claim:

1. Data receiving, storing and imprinting apparatus adapted to receive and store data carried by a card having thereon first embossed data indicia and second machine readable data indicia, said first and second indicia corresponding to a customer's account number, and to imprint a sales ticket placed against said card, comprising:

housing means including a top;

station means on said top for holding said card and sales ticket;

manually operable marking means at or near said station means for providing third machine readable data indicia corresponding to the value of a purchase and for marking said sales ticket to indicate the value of a purchase;

manually movable imprinting and data reading means on said top and mounted to move along a predetermined path past said station means and past said marking means so that, when the card and ticket are properly positioned at the station means, the second indicia on the card and the third indicia provided by the marking means are scanned and the sales ticket is marked with data corresponding to the customer's account number and value of a purchase, said reading means including means which responds to the second and third indicia and generates signals corresponding thereto; and recording means within the housing and coupled to the data receiving means for receiving and storing said signals on removable means within said recording means.

2. The apparatus of claim 1 wherein said recording means is a modular cassette magnetic tape recorder.

3. The apparatus of claim 1 wherein said recorder is connected to a rechargeable battery within the housing.

* * * * *